Sept. 13, 1960 F. G. VON HOORN 2,952,420
REEL FOR ELECTRICAL CORD
Filed Oct. 1, 1956
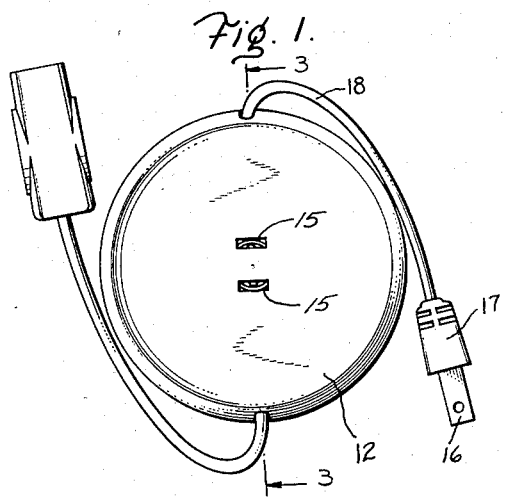
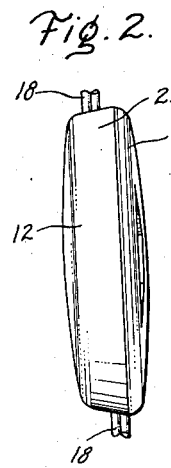
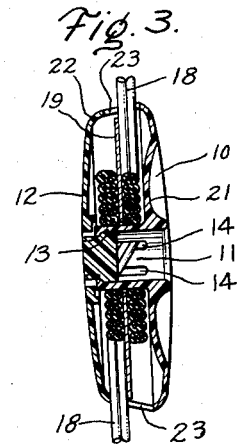
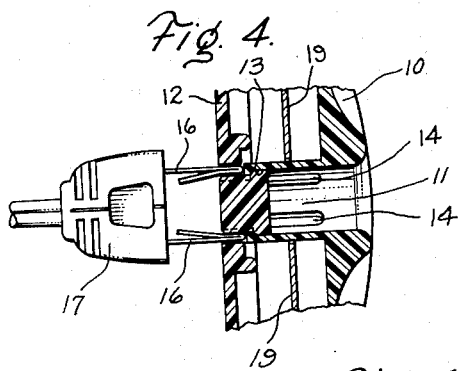
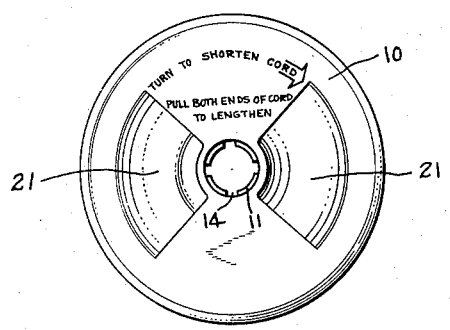
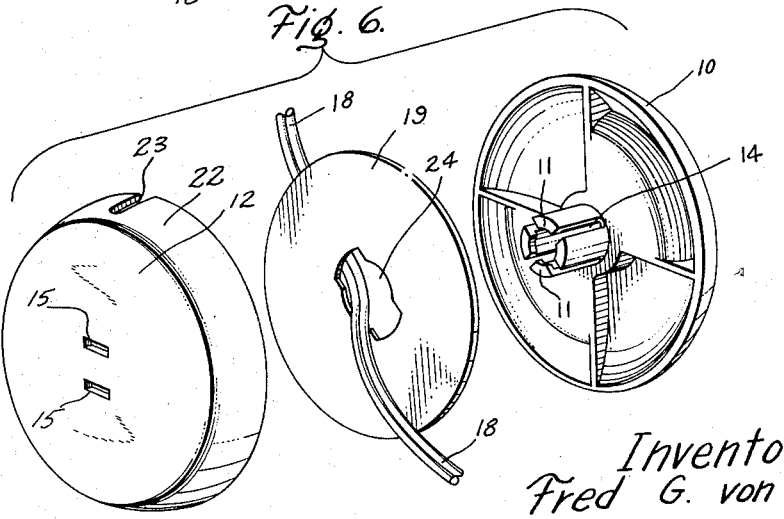
Inventor:
Fred G. von Hoorn
by Allard A. Braddock
His Attorney

United States Patent Office 2,952,420
Patented Sept. 13, 1960

2,952,420
REEL FOR ELECTRICAL CORD

Fred G. Von Hoorn, Warwick, R.I., assignor to General Electric Company, a corporation of New York Filed Oct. 1, 1956, Ser. No. 613,160

1 Claim. (Cl. 242—100.1)

This invention relates to a reel adapted for simultaneously reeling two ends of a cord; more particularly, the invention relates to a take-up reel adapted for anchoring the center portion of a cord positioned therein whereby rotation of the spool draws both ends of the cord toward the reel.

The present reel is adapted particularly for use on electrical appliance cords. In many instances, electrical appliance cords are much longer than they need to be for the particular installation and the extra length of cord is unsightly and dangerous to those who might trip on it. Accordingly, the present invention has as one of its objects the production of a reel adapted particularly for taking up slack in an electrical appliance cord.

Another object of the invention is to provide a cord reel of light-weight construction and minimum size.

A further object of the invention is to provide a cord reel which can be readily positioned on a cord and which will take up excess cord in orderly level-wound layers.

Other objects of the invention will appear from the following specification and annexed drawing wherein Fig. 1 is a view of one flange of a reel mounted on a cord;

Fig. 2 is a view similar to Fig. 1 except that the reel has been rotated 90° around a vertical axis and the two ends of the cord are shown broken;

Fig. 3 is a sectional view taken along the line 3—3 of Fig. 1;

Fig. 4 is an enlarged broken section of the central portion of Fig. 3 showing the means for separating the two outer flanges of the reel;

Fig. 5 is a view of the flange opposite the flange illustrated in Fig. 1; and

Fig. 6 is an exploded perspective of the three principal parts of the reel.

Briefly stated, in accordance with one of its aspects, the invention is directed to a reel for simultaneously reeling two ends of a cord comprising a spool on which the portion of the cord to be taken up is wound, a rotatable end flange fixedly attached to the spool, a stationary end flange having a bearing surface engageable by the spool whereby the spool is rotatable with respect to the stationary end flange and demountable therefrom, and a divider with a central aperture positioned between the flanges whereby a cord on which the reel is mounted is wound on each side of the divider.

Referring to the drawing, the reel may be seen to consist of a first or rotatable flange 10, normally of circular configuration, which is fixedly positioned with respect to a spool 11. The rotatable flange 10 and spool 11 are shown integral but they may be separate elements as long as they are constructed so as to rotate together. The edge of the rotatable flange 10 is bent over so as to make engagement with a second or stationary flange 12 which has a central bearing surface 13 (best seen in Fig. 4) which is engageable by the spool 11.

The spool 11 includes four axially parallel slots 14 which serve not only for anchoring a cord running therethrough but also impart sufficient spring to the four solid segments of the spool to enable it to clamp on to the bearing surface 13 of the stationary flange 12. This clamping engagement is sliding rather than locking in order to enable the flanges 10 and 12 to be readily separated from each other. The flange 12 is equipped with a pair of apertures 15 through which the prongs 16 of an attachment plug 17 may be inserted and pressure applied against the spool 11 to break its engagement with the flange 12 and thus separate the flanges 10 and 12. The plug 17 may be part of a cord set 18 which is the cord upon which the reel itself is mounted.

Positioned between the flanges 10 and 12 is a divider 19 which is preferably "free-floating" during use of the reel. The convex exterior face of the flange 10 is preferably provided with depressed areas 21 which serve as finger grips to make the flange 10 easier to rotate.

The peripheral area of the flange 12 is folded over to form a rim 22 having a pair of notches 23 adapted for positioning the cord of the cord set 18. Preferably the notches 23 make frictional engagement with the cord since it is the friction within the reel itself which maintains the cord in wound position after it has been reeled in.

The divider 19 is equipped with a central aperture 24 which is made large enough for the passage of an attachment plug 17 and which is preferably large enough to avoid engagement with the spool 11. As best shown in Fig. 3, the flanges 10 and 12 are spaced far enough apart so that there is room for two layers of cord side by side with the divider 19 therebetween.

The operation of the reel will now be described with particular reference to Fig. 6. The plug 17 of the cord set 18 is inserted through the central aperture 24 of the divider 19 and the cord is pulled approximately half-way through the aperture. The spool 11 is inserted through the aperture 24 with the cord 18 between any two of the slots 14 and the cord is also positioned within the notches 23 of the rim 22 after which the two flanges are brought together with the bearing surfaces of the spool 11 and stationary flange 12 in engagement as best shown in Figs. 3 and 4. Holding the flange 12 stationary in one hand, the flange 10 is rotated to reel in each end of the cord as shown in Fig. 3. The cord engages the spool 11 and helps to maintain tight contact between the bearing surfaces of the spool 11 and stationary flange 12, thus restraining the reel from falling apart in the event of rough handling. The divider 19 maintains the coils from the two ends of the cord set separate so that no difficulty is encountered in obtaining coils which are level wound and evenly spaced. Frictional engagement is sufficient to maintain the cord in wound condition and it is merely necessary to exert a pull on the cord in order to lengthen it as may be desired. The reel may be readily demounted from the cord by utilizing the attachment plug 17 to break the contact between the flanges 10 and 12 as shown in Fig. 4 after which the cord set is unthreaded from the divider 19.

While the invention has been described with reference to a specific embodiment thereof, it is obvious that many variations are possible which still lie within the spirit of the invention. Therefore, it is intended that the scope of the invention will be limited only as may be necessitated by the appended claim.

What I claim as new and desire to secure by Letters Patent of the United States Patent Office is:

A reel for simultaneously reeling two ends of an electrical appliance cord comprising a spool having a plurality of surface slots parallel to its axis, a rotatable end flange of circular conformation fixedly attached to said spool and concentric therewith, finger hold means for rotating said rotatable end flange, a stationary end flange of circular conformation substantially coextensive with said rotatable end flange having a bearing surface concentric with said rotatable end flange and engageable by said spool whereby said spool is rotatable with respect to said stationary end flange, said stationary end flange having a pair of central apertures in register with the edge of said spool engageable with the bearing surface of said stationary end flange whereby pressure exerted against said spool through said apertures can separate said spool from said bearing surface, said stationary end flange includinng an outer closure rim with a pair of slots for the passage of said cord, and a divider of circular conformation positioned between said flanges, said divider having a central aperture adapted for passage of a cord therethrough whereby equal portions of said cord are wound on each side of said divider.

References Cited in the file of this patent

UNITED STATES PATENTS

| | | |
|---|---|---|
| 126,939 | Denmark et al. | May 21, 1872 |
| 1,175,659 | Pahlke | Mar. 14, 1916 |
| 1,386,918 | Westrup et al. | Aug. 9, 1921 |
| 2,016,441 | Kelley | Oct. 8, 1935 |
| 2,211,561 | Flannelly | Aug. 13, 1940 |
| 2,438,515 | Mohler | Mar. 30, 1948 |
| 2,565,339 | Anderson | Aug. 21, 1951 |
| 2,656,991 | Neely | Oct. 27, 1953 |

FOREIGN PATENTS

| | | |
|---|---|---|
| 478,803 | Great Britain | Jan. 25, 1938 |
| 697,522 | France | Nov. 4, 1930 |